US011763371B2

(12) United States Patent
Rackley, III et al.

(10) Patent No.: US 11,763,371 B2
(45) Date of Patent: *Sep. 19, 2023

(54) VEHICLE SUGGESTION REPORT GENERATOR

(71) Applicant: Clutch Technologis, LLC, Atlanta, GA (US)

(72) Inventors: Brady L Rackley, III, Atlanta, GA (US); John R. Phelps, Atlanta, GA (US); Adam J. Carley, Atlanta, GA (US); Vincent G. Zappa, Atlanta, GA (US); Steven S. Neel, Atlanta, GA (US); Sangameswar Venkatraman, Atlanta, GA (US); Benjamin E. Morgan, Doraville, GA (US); Seaton G. Bailey, Atlanta, GA (US); Stuart H. Childs, Atlanta, GA (US); Taylor M. Sandusky, Atlanta, GA (US); Lisa Romero, Ellenwood, GA (US); Grant Stevens, Atlanta, GA (US); Kyle L. Clements, Atlanta, GA (US)

(73) Assignee: Clutch Technologis, LLC, Atlanta, GA (US)

(*) Notice: Subject to any disclaimer, the term of this patent is extended or adjusted under 35 U.S.C. 154(b) by 232 days.

This patent is subject to a terminal disclaimer.

(21) Appl. No.: 17/039,248

(22) Filed: Sep. 30, 2020

(65) Prior Publication Data
US 2021/0012411 A1 Jan. 14, 2021

Related U.S. Application Data

(63) Continuation of application No. 15/267,145, filed on Sep. 16, 2016, now Pat. No. 10,891,677, which is a
(Continued)

(51) Int. Cl.
*G06Q 30/0601* (2023.01)
*G06N 20/00* (2019.01)
*G06N 5/025* (2023.01)

(52) U.S. Cl.
CPC ........ *G06Q 30/0631* (2013.01); *G06N 20/00* (2019.01); *G06N 5/025* (2013.01)

(58) Field of Classification Search
None
See application file for complete search history.

(56) References Cited

U.S. PATENT DOCUMENTS

| 10,891,677 B2* | 1/2021 | Rackley, III | G06N 3/006 |
| 2008/0195435 A1* | 8/2008 | Bentley | G06Q 30/0603 705/7.33 |
| 2017/0004560 A1 | 1/2017 | Rackley et al. | |

OTHER PUBLICATIONS

The Use of Machine Learning Algorithms in Recommender Systems: A Systematic Review, Ivens Portugal et al. (2015) (Year: 2015).*

* cited by examiner

*Primary Examiner* — Dennis W Ruhl
(74) *Attorney, Agent, or Firm* — Smith Tempel Blaha LLC; Gregory Scott Smith

(57) ABSTRACT

A system and method for dynamically obtaining and evaluating information to optimize the generation of vehicle suggestions for a customer. A profile based on an initial set of information received from a user is created. Metrics are generated based on the profile information. Upon receiving a vehicle request, the profile and the request are analyzed in view of available vehicles. A customer's response to the vehicle suggestion list, as well as events triggered by a perceived need for additional information result in the dynamic adjustment of the profile and thus, the generated metrics.

10 Claims, 3 Drawing Sheets

Related U.S. Application Data continuation-in-part of application No. 14/847,881, filed on Sep. 8, 2015, now abandoned.

(60) Provisional application No. 62/046,813, filed on Sep. 5, 2014.

VEHICLE SUGGESTION REPORT GENERATOR

This application is a continuation of U.S. patent application Ser. No. 15/267,145 filed on Sep. 16, 2016, which application was filed concurrently with and incorporated by reference in their entirety:

United States Patent Application bearing the title of SYSTEM AND METHOD FOR SCORING THE FIT OF A VEHICLE FOR A GIVEN FLIP REQUEST, filed on Sep. 16, 2016 and assigned Ser. No. 15/267,144;

United States Patent bearing the title of LEARNING AGENT THAT FACILITATES THE EXECUTION OF A SUBSCRIPTION VEHICLE SERVICE BY DYNAMICALLY GENERATING MESSAGES AND PROCESSING RESPONSES TO GENERATE AND AUGMENT DATA THAT CAN THEN BE USED IN SUGGESTIONS TO CUSTOMERS, filed on Sep. 16, 2016 and issued U.S. Pat. No. 10,521,848;

United States Patent Application bearing the title of SYSTEM AND METHOD FOR ALLOCATING VEHICLES ACROSS A POOL OF CUSTOMERS IN A SUBSCRIPTION VEHICLE SERVICE, filed on Sep. 16, 2016 and assigned Ser. No. 15/267,148.

This application is a continuation of U.S. patent application Ser. No. 15/267,145 filed on Sep. 16, 2016, which is a continuation-in-part of U.S. patent application Ser. No. 14/847,881 filed on Sep. 8, 2015, which claims the benefit of U.S. Provisional Application Ser. No. 62/046,813 filed on Sep. 5, 2014.

BACKGROUND

The parent application to this disclosure addresses a need in the art for a system and a method of controlling risks, administering assets, scheduling operations, and providing highly personalized customer service for a service offering subscription vehicle access. As one of ordinary skill in the art would expect, a provider of a subscription vehicle service, as well as a client to a subscription vehicle service, may have a need for an artificially intelligent capability for identifying vehicle suggestions for customers or swap suggestions based on use case.

Therefore, there is a need in the art for a system and method of dynamically obtaining and evaluating information in view of requests from customers and available vehicle fleet inventory to generate a vehicle suggestion list to be presented to a customer.

SUMMARY OF THE DISCLOSURE

Various embodiments of methods and systems for providing interaction with customers of a subscription vehicle service to optimize the presentment of vehicle choices to a user based on artificial intelligent analysis of available information and the domain of available vehicles within the subscription vehicle service.

Initially, the subscription vehicle service presents new customers with a set of questions used to generate an initial profile. One of the purposes of the profile is to serve as a reference area that contains information about a user account and the users that are associated with that user account. Further, the information is utilized to either identify additional information that is needed or would be beneficial, initiate a campaign to obtain this additional information and/or present optimized suggestions or recommendations to a user in response to a vehicle request, such as obtaining an initial vehicle or performing a vehicle swap, or to reach out to suggest a swap. Overall, one of the goals of the various embodiments of this invention is to provide a level of artificial intelligence that dynamically approaches an improvement in customer satisfaction in their use of the subscription vehicle service by analyzing tangible and quantifiable metrics obtained from the customer and/or through analysis of the profile.

Over the course of the relationship with the customer, the profile is dynamically updated based on a variety of factors and activities, including but not limited to further input from one or more users of the account when selecting a vehicle, actual driving characteristics of the one or more users, direct feedback from the users, aggregated information from other users not associated with the user account and interactions of the one or more users with the subscription service user interface, as non-limiting examples.

An engine, operating to provide the artificial intelligence, either autonomously or in response to a user request, analyzes the profile and the available domain of vehicles and then either provides one or more vehicle or swap suggestions to the customer or, initiates a campaign to collect further information to be analyzed prior to providing the one or more suggestions.

Thus, the system and method dynamically and reiteratively modifies the profile to ultimately optimize the vehicle suggestions with a goal of improving customer satisfaction.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. The specific letter character designation "N" or "n" is meant to indicate that the particular element is not limited to any specific quantity. Letter character designations for reference numerals may be omitted when it is intended that a reference numeral to encompass all parts having the same reference numeral in all Figures.

DETAILED DESCRIPTION

Figure 1:
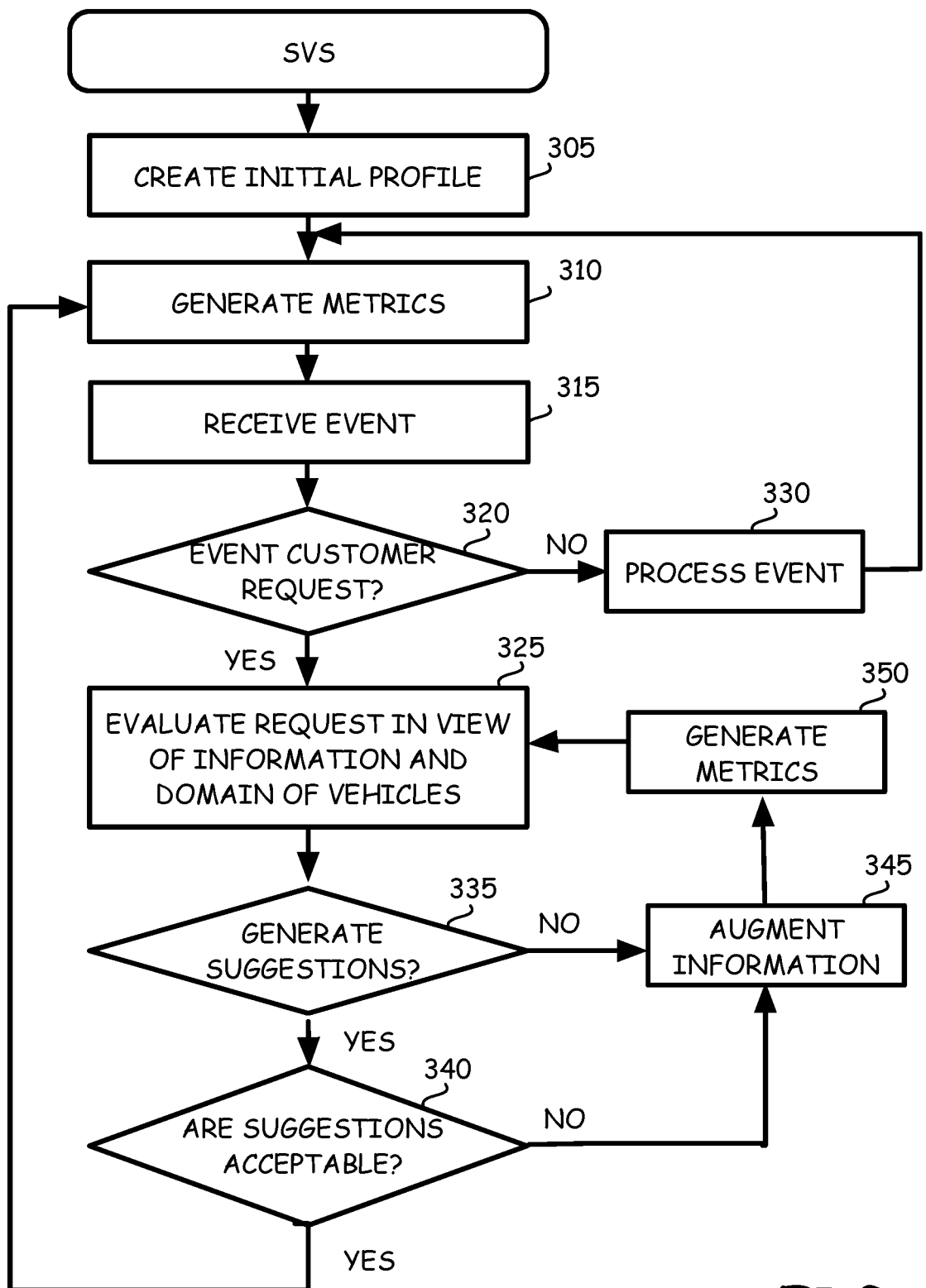
FIG. 1 is a high-level flow diagram illustrating an exemplary process for the dynamic information based subscription vehicle service.

This disclosure presents embodiments, as well as features, aspects, functionality, etc., of a subscription vehicle service in which customers are matched with vehicles in response to a customer request for a vehicle. The embodiments present techniques for gathering, updating and maintaining customer information and then responding to a customer request by either generating a list of vehicles and/or initiating the gathering of additional information to more accurately respond to the request. Thus, the embodiments focus on two main operations: (1) the gathering and augmentation of customer information and (2) algorithmically generating a suggestion list of one or more vehicles that would optimize the match to fulfill a customer request. In an additional embodiment, the system can algorithmically suggest a swap, such as suggesting a swap to vehicle X, or to vehicle type Y or to a particular vehicle that is well suited for a particular use case Z.

The present disclosure focuses on inventive techniques for performing the afore-mentioned objectives and thus, to increase the value of the information within the subscription vehicle service system such that the objections of the service can be more readily attained.

Definitions

The term "exemplary" is used herein to mean serving as an example, instance, or illustration. Any aspect described herein as "exemplary" is not necessarily to be construed as preferred or advantageous over other aspects.

The term "application" may include files having executable content, such as: object code, scripts, byte code, markup language files, and patches. In addition, an "application" referred to herein, may also include files that are not executable in nature, such as documents that may need to be opened or other data files that need to be accessed.

The term "content" may include files having executable content, such as: object code, scripts, byte code, markup language files, and patches. In addition, "content" referred to herein, may also include files that are not executable in nature, such as documents that may need to be opened or other data files that need to be accessed.

The terms "component," "database," "module", service," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The terms "communication device," "wireless device," "wireless telephone," "wireless communication device," and "wireless handset" are used interchangeably. With the advent of third generation ("3G") wireless technology and four generation ("4G"), greater bandwidth availability has enabled more portable computing devices with a greater variety of wireless capabilities. Therefore, a portable computing device (a "PCD") may include a cellular telephone, a pager, a PDA, a smartphone, a navigation device, or a hand-held computer with a wireless connection or link.

A "subscription" is an account with the service. A "subscriber" or "client" is a named person who has entered into a contract for service and is listed on the account. A "driver" or "named driver" is a person that has been approved by the service to drive one or more vehicles associated with the account on a habitual basis or for an extended period of time. A subscription may have multiple drivers listed on the account. A subscription account may have one or more vehicles assigned to it at any period in time. Each driver may be approved to drive one, some or all of the vehicles assigned to the account.

A "predictive feature" or "feature" is defined as, in the practice of machine learning and pattern recognition, an individual measurable property of a phenomenon being observed. Choosing informative, discriminating and independent features may be a crucial step for effective algorithms in pattern recognition, classification and regression. Features are usually numeric, but structural features such as strings and graphs are used in syntactic pattern recognition. The concept of a "feature" is related to that of a "dependent variable" (or "explanatory variable") used in statistical techniques such as linear regression.

The term "possession" is used herein to denote the period of time when a vehicle is assigned to a subscriber or client and is in the custodianship of that subscriber or client. This concept is distinct from "rental" for at least the reason that when a vehicle is rented, the amount paid is a function of the time that the subscriber has the car. Under a subscription service, the payment may comprise a flat fee that does not depend on either the duration of possessions or the frequency of swaps.

The present disclosure, which should be viewed with reference to the above-incorporated parent and related applications, generally relates to a system for and a method of administering assets and scheduling operations for a service offering subscription vehicle access. More specifically, exemplary embodiments relate to a system for and a method of providing a subscription vehicle service that provides vehicle suggestions based on a dynamically changing set of information and an artificial intelligent analysis of the information to generate vehicle suggestions and/or initiate campaigns for the collection of further information.

FIG. 1 is a high-level flow diagram illustrating an exemplary process for the dynamic information based subscription vehicle service. Initially, a profile is created 305. Generally, when a new customer subscribes to the subscription vehicle service, the new customer is presented with a set of questions about a variety of topics, such as their household demographics, lifestyle, personality characteristics (likes, dislikes and elements to which they are indifferent), driving characteristics, vehicle requirements, commuting demographics (daily, monthly, annually etc.), storage requirements (garage size, parking deck restrictions) and income ranges as a few non-limiting examples. This information can be collected during the sign-up process or, portions or all of the information can be collected or provided at a later time. The customer can enter this information through an internet browser, mobile smart phone, tablet, etc. that the customer is using to access the subscription vehicle service system ("SVS"), or through a or a resident application that accesses the SVS from a mobile device or computing system. The SVS is a computing environment that houses and runs the subscription vehicle service. The SVS receives the information from the customer and populates a profile that houses the information about the account and the users that are associated with the account.

The SVS accesses the information that is incorporated into the profile and generates metrics 310. Among other things, the metrics include value attributes for various categories of information and use cases. The value attributes can best be understood by way of example. As a non-limiting example, if a customer does not provide a vehicle color preference, the value attribute for the color of a suggested vehicle may be low or zero. As another non-limiting example, if the household demographics indicate that the customer has a large family, such as a spouse and 3 kids, the value attribute for vehicles with seating availability of 5 or more passengers may have a high value. Further, it should be appreciated that the attribute values may be multifaceted and taking several parameters into consideration. As a non-limiting example, suppose a customer has a large family and also owns a minivan. A value attribute for lower occupancy capacity may be set to a high value for vehicle requests that are directed towards daily work commutes but, for a lower value for requests that are directed towards weekend travels. It should be appreciated that a seemingly endless number of metrics could be considered in various implementations of the SVS, and that the SVS incorporates artificial intelligence, at least in the forms of heuristics and algorithms to dynamically identify and create various value attributes as the information available expands, contracts and changes. Further, it will be appreciated that the value attributes operate to define the profile information in terms of factors such as specificity, fit with actual behavior and recency, and that try to quantify normally intangible aspects of the customer's relationships with the SVS such as the customer's level of trust, desire for control and satisfaction. Thus the value attributes can include a canned number of common value attributes, such as the non-limiting example in TABLE 1.

TABLE 1

Example of Attribute and Assigned Values

| Attribute | Profile Information | Value Attribute |
|---|---|---|
| Color | White, black, tan | 80 |
| Number of doors | 4 | 100 |
| 0 to 60 rating | — | 50 |
| Occupancy | 5 | 100 |
| Safety rating | Highest | 90 |
| Fuel Efficiency | Minimum of 20 mpg | 90 |
| Handless entry | Yes | 90 |
| Storage capacity | High level | 90 |
| Rear seat DVD displays | Required | 100 |
| Convertible | No | 0 |
| Moon roof | — | 50 |
| Automatic | Yes | 100 |
| Manual | No | 0 |
| Blue Tooth Equipped | Yes | 90 |

TABLE 1 presents a simple sub-set of potential attributes and an exemplary set of information that could be present in a particular profile in view of the attributes. The process of generating the metrics 310 then applies heuristics and algorithms to associate a weighting factor with each of the attributes based on the profile information to create the value attributes with a value of 0 to 100 in the illustrated example where 0 is no value and 100 is the maximum value.

It should be appreciated that each customer may have multiple profiles for differing requests, such as a recreational profile and a professional profile. Such profiles could also be mapped to use cases, and thus, different profiles could be viewed as different use cases.

As those skilled in the art will understand, in some embodiments, a use case describes the behavior of the SVS as it responds to a series of related requests from a customer. The SVS generates the initial use cases based on the information received and as the information is expanded, contracted or modified, the SVS modifies and updates the use cases. As a non-limiting example of a use case, in response to a request from a customer for a vehicle, a use case may take into consideration the specific parameters of the request in view of the value attributes and other ancillary information to generate a response to the request. As is further discussed below, the response may include one or more vehicle suggestions and/or requests to the customer or other sources for additional information. Thus, in one specific example, a customer may request a vehicle for a trip to Panama City Beach Fla. for the period of time from Apr. 1 to Apr. 8, 2016. A use case may be set up to activate a trigger that indicates the requested time period coincides with the spring break for the customers children based on requests from prior years, calendar information of the customer, data mined from the website for the school system in which the customer's children are enrolled, etc. In addition, the use case may take into consideration the various value attributes of the customer and then generate a request for further information if needed. Thus, as previously mentioned, a customer may have multiple profiles but, a use case can be utilized to create the essence of multiple profiles by pooling only particular attributes from the profile information.

In other embodiments, a use case could be constructed as follows:
(1) Member purpose (e.g., family road trip)
(2) Needs resulting from purpose (e.g. 5 seats)
(3) Preferences (e.g. smooth ride)
(4) Typical timing A variety of such general use cases could be established for a member. And thus, when a specific occasion arises, such as one that matches significantly with a general use case, the general use case combined with the specific occasion may result in a swap.

The SVS may include a list of use cases that serve as a pool of available use cases. As the profile information is entered and augmented, particular use cases based on the profile information can be selected for the particular profile. Additional use cases can be added to the SVS in the future, either by an operator or by being dynamically generated based on profile information of an individual, multiple customers, identified trending, etc.

In addition or alternatively, the system may initiate an information campaign to collect further information. As a non-limiting example, the SVS may send a text to the customer to confirm that the customer is taking his or her family on a spring break vacation. Further, the use cases within the profile for each customer can be displayed as a set of options through which this customer can request a swap within the SVS, such as through a mobile app. For each option the customer interface may be used to display additional details designed to convey the essence of the option (e.g. intended use case) and selected criteria that can be used for assigning a vehicle if the option is chosen (e.g. number of seats, amount of luggage). The customer interface can allow the customer to browse and select an option. When selecting an option, the customer may choose to provide additional information. Such additional information can be provided through the entry of free form text, drop down menu selection, radial button selection etc., and the information may augment or correct the details that are current presented to the customer. Further, the information may be edited in the background by a system operator on behalf of the member. The customer interface may also include the ability for the customer to request a new option and describe their needs via any of a variety of input mechanisms. After selecting an option, the customer may input their desired date, time and location to receive a vehicle and submit their request. In other embodiments, the customer may request a swap via a messaging medium such as SMS, a messaging client within the SVS mobile app, or via a third party messaging app or even email, voice messaging etc. In such embodiment, the customer may reference one of the options described in the customer interface or otherwise just describe what they need using free form text.

Having a general understanding of the value attributes and use cases of the SVS, the additional processes in the flow diagram of FIG. 1 can be explored. Once the initial value attributes and use cases are generated, the SVS is armed and ready to receive and respond to an event 315. An event may take on a variety of forms and be initiated by a variety of sources or circumstances. As non-limiting examples and event may include a vehicle request from a customer, an update on the domain of available vehicles in the fleet, an alert regarding the status of a vehicle in the fleet, or simply an update of information that is generated or made available from an external source and that may have an impact on the general operation of the SVS, such as requiring an update of use cases across the SVS system or, may simply be pertinent to a subset of the SVS accounts or even a single account.

When an event is received, the SVS may operate to evaluate the type of event and respond accordingly 320. For example, if the event is a customer request, the SVS continues by evaluating the request in view of information already of record and/or that is available to the SVS, and the domain of vehicles available in the fleet 325. However, if the event is not a customer request, the event is further processed 330 and the metrics are regenerated 310 based on the results of the event. It should be appreciated that even though the even is not a customer request for a swap, the event could results in a suggestion to swap in some embodiments.

Events that are customer requests can include, but are not limited to, the form of a vehicle swap request, an initial request if the customer does not have a vehicle currently or a vehicle return/pick-up request. When the event is a customer request, once the request is evaluated 325 the SVS determines if one or more vehicle suggestions 335 are to be generated.

The customer request can take on a variety of forms and include a variety of information. For example, a customer request may simply convey information to the SVS that the customer wants a different vehicle. In response to such a minimalist request, the SVS relies heavily upon the profile information available, as well as the current status of the vehicle fleet to generate one or more vehicle suggestions. In other situations, the customer may include a highly detailed request, such as the make, model, year, color and features of the vehicle. In response to such requests, the SVS may focus more heavily on the current status of available vehicles in the fleet, and then augment the evaluation based on profile information if a direct match is not available. It should be appreciated then that the request can take on any of a variety of forms and thus, the SVS applies artificial intelligence is evaluating and responding to the customer request.

Further, the SVS may evaluate the information submitted via the request. This evaluation may include any "adjacent" or "ancillary" information such as messages sent proximal to the submission of the request. The SVS may also apply natural language processing and machine learning algorithms to determine whether additional information would be helpful, whether any ambiguous instructions require clarification or whether the requests contradict previously expressed preferences such that clarification would be helpful. In the event that a request is made via free text without reference to a specific option or attribute, the evaluation engine of the SVS may also evaluate whether the request maps closely to an existing option or whether it is better handled by creating a new option or attribute. The evaluation engine may take as inputs all the customer's history interacting with and using the SVS. In particular, data on the customer's current state (e.g., current vehicle's type status, and location) may also be taken into account as a non-limiting example.

Based on the operation of the evaluation engine, the SVS may initiate a task to generate the vehicle suggestions 335 or, augment the available information by initiating an event to obtain more information from the customer and/or from other sources 345. In augmenting the information, the SVS may generate one or more questions that can be conveyed to the customer via a variety of mediums, such as SMS, push notifications, messaging client or a third party messaging app as non-limiting examples. In addition or in the alternative, the SVS may generate a prompt for a SVS staff member to compose a message to the customer to gather information specified in the prompt. The SVS staff member may gather such information using a messaging medium, via a phone call and/or even face-to-face. The SVS staff member may receive such a prompt via a desktop computer in a contact center or via an application on a mobile device while working in the field. An SVS staff member may be authorized to interpret the prompt generated by the SVS and then choose to execute the prompt as provided, apply judgment in how to interpret the prompt or reject the prompt. If the responses from the customer are gathered either over the phone or face-to-face, then the SVS staff member can input the customer's response into the SVS system.

If a customer response is received by the SVS, the evaluation engine may run again to determine if the additional information is sufficient or if further information is required. If further information is required, the SVS may generate further tasks to obtain the further information. These tasks may manifest as successive questions posed to the customer using any of a variety of communication techniques as well as any of the afore-mentioned techniques as well as others. The combination of question and answers or responses may resemble a conversation. If no response is received, the SVS may operate to adjust the task so that it is executed or delivered via a different medium and/or includes different content. For instance, if an SMS does not generate a response, the SVS may initiate a call with voice prompts and voice recognition, prompt an SVS staff member to place a call, sending an email, etc. As another example, the SVS may rephrase the request in a different manner to further solicit a response, such as removing options presented for the response and requesting a free form text response instead.

Further, the process of augmenting the information may include pooling information from other customers and/or by obtaining information from other sources. As a few non-limiting examples, other information could include gas prices where a customer may be traveling, anticipated vehicle swaps from other customers, vehicle availability at other locations that a customer may be traveling to, consumer reports pertaining to particular vehicles including consumer reviews, maintenance issues, mean-time-between-failures for vehicles, predicted climate and environmental conditions at locations to be traveled to by the customer, etc.

Telematics data may also be a source of information. A wide range of telematics data can be collected, analyzed and then be utilized in a variety of manners when generating vehicle suggestions or swap suggestions. For instance, the location of a driver's current vehicle could be obtained from telematics data and such information may be used in identifying favorable swaps, such as nearby vehicles. In addition, the roads that a member travels could be evaluated from the telematics data to determine the most suitable vehicle type based on the roads (i.e., dirt roads, roads through constructions zones, mountainous roads, curvy roads, limited speed limit roads, roads through highly populous areas, etc.). Further, telematics can be used to determine driver characteristics, habits, styles and techniques and then used to find vehicles that are suitable for such characteristics, habits, styles and techniques. As a non-limiting example, if the driver makes a significant number of stops, it may be determined that the driver operates a delivery service and could be susceptible to being hit by other cars. In such a situation, the swap may focus on vehicles that are highly visible. Those skilled in the art will appreciate that much information could be heuristically gleamed from information such as telematics data and thus used in the generation of vehicle suggestions or swap suggestions.

The SVS may apply a variety of techniques in augmenting the information 345 and regenerating the metrics 350. The system can apply natural language processing and machine learning algorithms to identify what information has been collected and how to append that information to the profile of the customer. In some embodiments, a set or subset of the tools available within IBM's WATSON can be utilized to perform the natural language processing and related ML work. The SVS may operate to extract one or more keywords, each of which may be used to generate attribute values, which could be based on the relevance and sentiment associated with the keywords or other weighting. For example, one or more keywords may be determined to pertain to a particular persistent topic, such as preference given to vehicle color or style, and that information and value attributes can be appended to the profile information related to such topics. Keywords that do not fall into a persistent topic may be added as a general entry in the profile information or may be clustered to identify emerging topics. They SVS can append information to the profile at an account level, at an individual customer level, or to a specific use case. Over successive iterations, each individual use case can have it own profile or sub-profile created that documents how the customer's needs and preference have evolved over time. The SVS can further generate a "current stance" on each topic by applying logic to synthesize the various signals on that topic, weighting on frequency, recency and relevance. These current stances can be used as inputs into heuristics, algorithms and other artificial intelligent engines to assign vehicles to members and to generate vehicle suggestions.

If the evaluation generates one or more vehicle suggestions 335, the suggestions may be evaluated by the SVS and accepted or rejected, and/or the vehicle swap or suggestions may be presented to the customer and either accepted or rejected. The SVS may reject the vehicle suggestions for a variety of reasons, such as the list is too long, or the list is inconsistent with other parameters that may exist in the information as a few non-limiting examples. The customer may also reject the vehicle suggestions if none of the available suggestions is satisfactory or desired. If the generated one or more vehicle suggestions is not acceptable 340, the SVS augments the information in the system based on the rejection of the vehicle suggestions 345 and/or may initiate a process to obtain additional information 345. As a non-limiting example, the SVS may slightly decrease the value attributes for each of the attributes that are common to the vehicles in the vehicle suggestion list, decrease all of the value attributes associated with each of the vehicles in the vehicle suggestion list, decrease the value attributes for value attributes associated with vehicles in the vehicle suggestion list that fall below a threshold value, skewing the value attributes, etc. Also, for a swap suggestion, the system may reject the swap if timing is not quite right. The SVS may then also regenerate the metrics 350. The SVS then continues to evaluate the request 325 to process the outstanding customer request.

If the vehicle suggestions are accepted by the SVS, then they are presented to the customer. If the customer accepts one of the suggestions, then the SVS uses this information to augment the profile information and then regenerates metrics 310 and then waits for the next event to be received 315. The SVS may augment the information in a variety of manners. A few non-limiting examples include increasing the value attributes that are associated with the selected vehicle, increasing the value attributes that are uniquely associated with the selected vehicle, decreasing the value attributes that are uniquely associated with the non-selected vehicles, etc.

Once the process begins with the creation of the initial profile, the process can run indefinitely attempting to approach a maximum value of certainty in the generation of vehicle suggestions. The value of certainty can be measured by the number of vehicle suggestions generated in response to a customer request, the number of rejections from the SVS and/or the customer, and the number of successful hits obtained by the customer accepting one of the vehicle suggestions as a few non-limiting examples. Other information sources may also be used to measure the value of certainty, such as soliciting direct feedback from the customer through push requests, customer satisfaction surveys, etc.

If the value of certainty drops below a specific threshold, such as X number of rejections in a row or a percentage of rejections averaged over a period of time or over a number of vehicle suggestions, the SVS can initiate a recovery operation. In some embodiments, the recovery operation may involve rolling back the profile information, metrics, value attributes, etc., to a point in time that the value of certainty was at an acceptable level or an optimal level and then continue with the process from that point. In other embodiments, the SVS may roll back to the initial profile in an attempt to recover. The SVS can maintain a list of the questions previously posed, campaigns initiated and information gathered and actively avoid all or subsets of the steps that were employed in reaching the low threshold value of certainty. If the SVS determines that the value of certainty has reached an upper threshold, the SVS can stop or limit further collection of information and metric generations in an attempt to maintain the current value of certainty.

In some embodiments, another threshold value may be utilized to establish a hysteresis for the value of certainty. For instance, when the value of certainty reaches an upper threshold, the SVS may limit or stop further data collections. If the value of certainty drops below another threshold, the SVS may resume data collection and metric generation.

The described aspects and functionality of the SVS are advantageous for the operator of the SVS as well as the customers. One such advantage is that the SVS can operate to reduce the cost of providing the subscription vehicle service. This advantage can at least be realized in the fact that the service provider, having full knowledge of the vehicle fleet, including the locations, operational costs, wear and tear and maintenance schedules, etc., coupled with knowledge of the domain of customers that have subscribed to the service, can not only generate vehicle suggestions based on the user oriented metrics, but also based on the cost to deliver the vehicles and the risk associated with having to implement an emergency exchange out. Further, the SVS system, through the use of artificial intelligence, increases the value of certainty such that customer satisfaction can be improved, thus creating an affinity with the customer base as well as gaining new customers by word of mouth from satisfied customers.

Another advantage is that the SVS can operate to tweak the service pricing and monitor the results that are incurred. For instance, if a particular customer is frequently switching between a higher cost vehicle and a lower cost vehicle, the cost for providing the service can be increased. In such circumstances, as a non-limiting example, the SVS can lower the cost of the higher cost vehicle and raise the costs associated with the lower cost vehicle. The SVS can then monitor the activity of the customer to determine if the adjustments result in reducing the frequency of swaps, reducing or increasing the income generated by affecting the activity of the customer or has other effects. If the desired affect is not achieved, other tweaks can be implemented and monitored.

Further, the service provider can also determine if certain customers are susceptible to being encouraged or enticed by promotional activities or pushes. For instance, if the SVS identifies a vehicle suggestion list, the SVS can include one or more additional suggestions at a reduced price in an attempt to entice the customer to select an otherwise non-optimal vehicle that may be more cost effective for the service provider to deliver or, that is more readily available (ie., such as a inventory item that has set idle for a prolonged period of time). Further, the SVS can provide future incentives to entice a customer to presently select a higher cost vehicle that is available and that can be delivered at a lower cost to the service provider, in exchange for receiving a discount on future selections.

Figure 2:
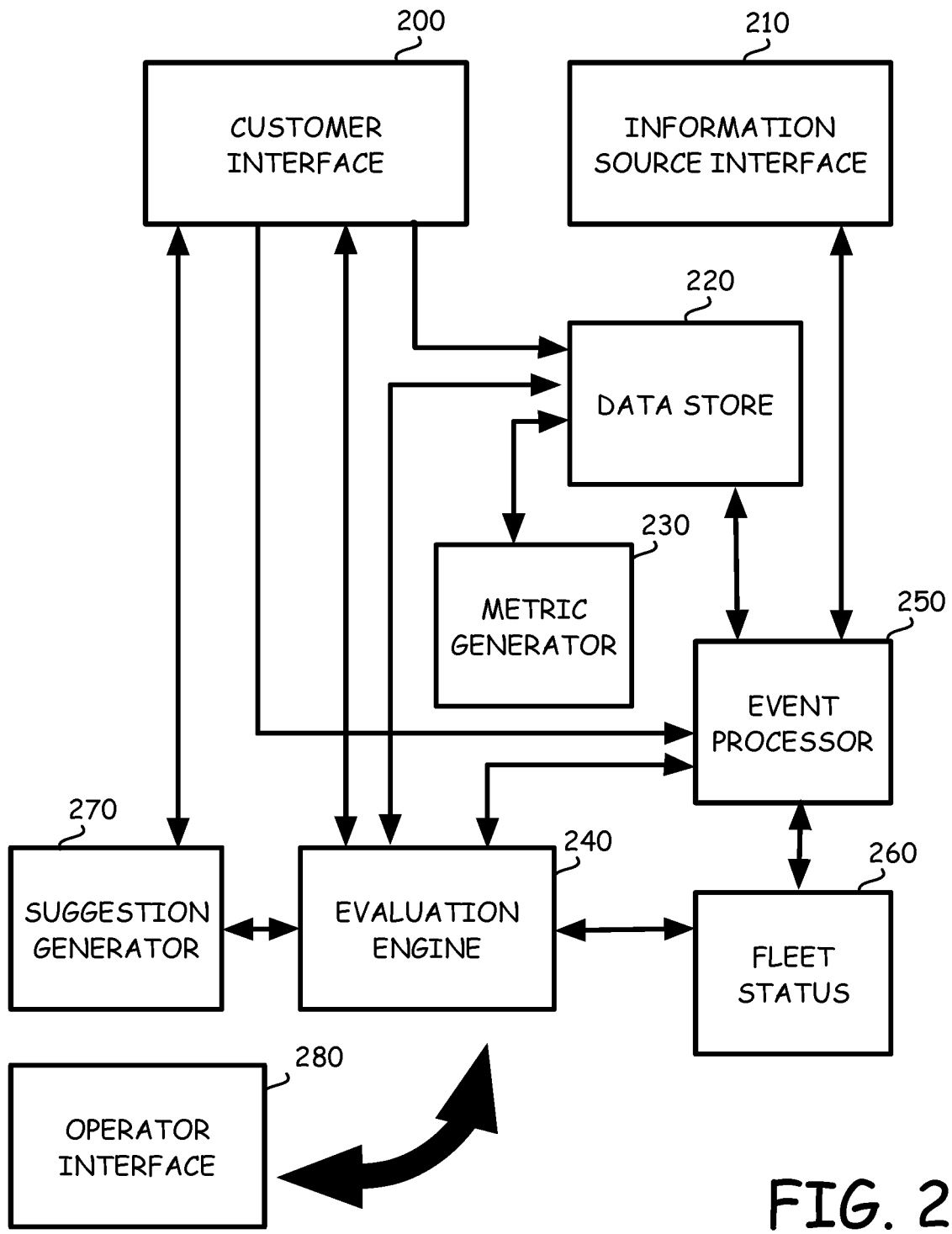
FIG. 2 is a block diagram illustrating functional operations of an exemplary embodiment of the SVS.

FIG. 2 is a block diagram illustrating functional operations of an exemplary embodiment of the SVS. It should be appreciated that the particular breakdown of the various functional blocks is only provided for an overall functional understanding of an exemplary embodiment and is not intended to illustrate an actual structural or architectural restriction on various implementations. For instance, the functionality in one illustrated block may actually be performed or implemented by multiple systems that are geographically dispersed, multiple modules in the same computing system, or multiple software flows in the same executable software element. In addition, functionality that is illustrated in separate blocks may actually be incorporated into the same software or hardware module. Thus, those skilled in the art will appreciate that the presented structure is simply provided to assist in the understanding of the overall functionality of an exemplary embodiment.

The functional block diagram illustrates a customer interface 200 and an information source interface 210. The customer interface 200 enables the SVS to interact with a customer that is registering to utilize the SVS, providing initial information for the creation of the customer and account profile, present vehicle suggestions from the SVS, as well as receive and respond to requests for additional information, provide feedback to the system and interact with the SVS for requesting vehicles and vehicle swaps, as well as a variety of other functionality as is presented in the above-incorporated applications.

The data store 220 is utilized as a database or storage medium for information that is acquired and/or utilized by the SVS. For instance, the initial profile information received through the customer interface 200, as well a augmentations thereto can be stored within the data store 220. In addition, the data store 220 can provide storage for generated metrics, including but not limited to use cases and value attributes, historical interactions such as prior suggestions and responses from the customer to such suggestions, customer feedback, or the like.

The information source interface 210 enables the SVS to interact with external systems, databases or other sources of information to further gather and/or augment the profile information and to obtain other information that can be utilized in the generation of metrics, evaluation of vehicle requests and other events and the generation of vehicle suggestions.

Periodically, the SVS will generate metrics as described in FIG. 1 for the metric generating events 310 and 350. The metric generator 230 receives input from the data store 220 in support of generating the metrics. As previously describe, the metric generator 230 relies not only upon the information in the data store 220 but also a set of algorithms and/or heuristics to analyze the available information for the generation and/or augmentation of value attributes, the generation and/or augmentation of use cases as well as identifying information deficiencies and providing input for generating events to gather further information. The metric generator 230 may also receive input directly from a system operator, the customer interface 200, the information source interface 210 as well as operate in conjunction with the evaluation engine 240 in generating the metrics.

The event processor 250 operates to receive and interpret various events that may be received by or occur in the SVS. The event processor 250 may receive events directly from the customer interface 200, such as a vehicle swap request, feedback, queries regarding vehicle availability, etc. In addition, the event processor may receive events that are triggered by the metric generator 220, the evaluation engine 240, the fleet status 260, the information source interface 210 or any other source or generator of an event in the SVS that needs to be processed. If an event received by the event processor 250 is a request for a vehicle or a vehicle swap, the event processor 250 can operate to trigger the evaluation engine 240 to generate a vehicle suggestion list (see processes 320 and 325 of FIG. 1). If the evaluation engine 240 determines that additional information is required or that additional information may be useful to generate a more optimum vehicle suggestion list, the evaluation engine 240 may trigger a campaign event for obtaining such further information by invoking such an event. The event processor 250 would operate on this event in any of the variety of manners describe in connection with processes 330 and 345 of FIG. 1. The fleet status may also result in triggering various types of events. For instance, as an operator updates the SVS through the operator interface 280, the operator can enter changes to the fleet, such as the addition of new vehicles, removing of sold assets or tagging assets as unavailable due to delivery or maintenance, etc. This information may then result in the generation of events to collect more information, modify information, regenerate metrics, etc.

The operator interface 280 may include a terminal access to the SVS, Internet access, mobile access through a browser or a resident app, messaging, etc. Through the operator interface 280, one or more operators can interact with most elements or functional capabilities of the SVS to provide further input or control. For example, the operator can directly interact with a customer by the operator interface 280 providing direct access to the customer through the customer interface 200. Such access could be in the form of messaging, push notifications, chatting, etc. Through the operator interface 280, the operator may also be able to review the information available in the data store 220, monitor, augment or control the operation of the metric generator 230, directly trigger events for the event processor 250, review/modify/reject vehicle suggestions from the suggestion generator 270, enable/disable/modify the various heuristics/algorithms of the evaluation engine 240, etc.

The evaluation engine 240 primarily analyzes the available data to provide input to the suggestion generator 270 and/or generate events for the event processor 250. The heuristics and algorithms utilized by the evaluation engine 240, as well as the metric generator 230, can be quite varied and are dynamically adjusted. As a previously stated goal of the SVS, customer satisfaction is of significant importance. The customer satisfaction can be measured in a variety of manners and the afore-mentioned value of certainty is only one such measure. Customer surveys, customer retention, expansion of customer base, level of customer interaction, was all as other metrics are all tangible and definable measures that can be used to determine if customer satisfaction is being achieved. Thus, as the system is deployed and operates in the field, new heuristics, rules and algorithms can be developed, deployed and monitored to see if the customer satisfaction metrics are beneficially or adversely affected. Based on these results, additional changes may also be implemented. In addition, the ability for customers to provide free form entry of information can also be used to generate and/or modify the heuristics, rules and algorithms. As a non-limiting example, the SVS can detect a trend of customers providing queries with regards to the miles per gallon ratings for vehicles, the volume of the gas tanks and the fuel efficiency. If such requests tend to be at a heightened level of frequency from customers that are swapping out for vehicles for long trips, the SVS may modify the operation of the evaluation engine to identify the number of miles that a vehicle or a class of vehicles will average between having to stop for refueling. As such, the heuristics may operate to generate a value attribute associated with the average distance between refueling then include consideration of other parameters, such as schedule, type of use (vacation or business trip), etc., as well as the new value attribute in evaluation a vehicle change request. It should also be appreciated that the artificial intelligence aspect of the SVS can be used to provide valuable information to the SVS operator. For instance, if the distance between fueling value attribute is trending towards a heightened level of importance, the SVS can provide operator notice to evaluate an expansion or modification of the fleet to include an increased number of vehicles with higher distance between refueling parameters or, modify some of the existing or upcoming expansions to the fleet to include auxiliary fuel tanks. In addition, the customer's engagement with a vehicle can be measured and used as an indication of satisfaction. For instance, the measured use of the vehicle, which can be determined based on telematics data obtained from a telematics device, may indicate that the user has a strong or weak affinity towards the vehicle.

The suggestion generator 270 responds to input from the evaluation engine 240 to identify vehicles that match the customer's vehicle request in view of the customer request and the information acquired as well as the value attributes etc. Further, the suggestion generator 270 operates in conjunction with the status obtained from the fleet status in finalizing a suggestion list for vehicle request or vehicle swaps. The vehicle suggestion list is also fed back to the evaluation engine for reviewing the list and either culling the list down based on current information or obtaining additional or augmented information through initiating an event. Further, the suggestion generator 270 can be set up with parameters to automatically cull the list of vehicle suggestions such as by limiting the list to a certain number of suggestions, eliminating certain suggestions from the list based on thresholds of similarity to other items, etc. For instance, equivalent cars are generally available from Chrysler, Plymouth and Dodge, as well as Chevy and Oldsmobile. The suggestion engine can eliminate such equivalents to provide greater variety in the vehicle suggestion list.

The suggestion list or swap suggestions may take on a variety of forms and be utilized not only as a presentment of options to the customer, but also as a tool to efficiently assign vehicles. As a non-limiting example, a suggestion list may include the elements as presented in TABLE 2.

TABLE 2

Example Suggestion List

| Vehicle | Match Rating | Cost |
| --- | --- | --- |
| Ford F-150 Crew Cab | 95% | $350 |
| Toyota Tundra | 85% | $325 |
| Ford F-250 Crew Cab Diesel | 80% | $275 |
| Lincoln Navigator | 75% | $300 |
| Ford Bronco | 75% | $300 |

In the illustrated example, the vehicle list or swap suggestions could be presented as is or with further detail. In addition, each entry may include a link to a page that provides further detail regarding the vehicle. The match rating is an indication of the appropriateness of the suggested vehicle in view of the evaluation of the profile information. Such a rating could be based on the number of attributes that match with the suggestion, weighted by the value attributes and the particular request. Thus, the process of analysing the customer request may include applying a series of heuristics to identify vehicles that match the metrics, such as the value attributes and/or use cases, and then ordering the vehicles based on the value of the match and the availability of the vehicles in the inventory. The vehicle suggest list may then be culled by selecting the vehicles that have the highest value of the match, such as a match that exceeds a minimal threshold, or selecting only a specific number of the vehicles such as the top 5 or 10 or X.

The suggestion list may also include a cost associated with the vehicle selection such as the monthly, weekly, daily recurring cost, the cost for a request period of time etc. It should be appreciated that use of a suggestion list of this form can be utilized to entice a customer to select a sub-optimum vehicle by providing a decrease in the cost. As illustrated in the example, if the operator is having difficulty in placing the Ford F-250 diesel, the cost associated with that particular vehicle can be reduced as an incentive to the customer to relax on the customer's requirement in order to attain the cost savings. In such a scenario, the customer reaps the benefit of the cost savings and the operator is able to utilize an under utilized vehicle in the fleet.

Figure 3:
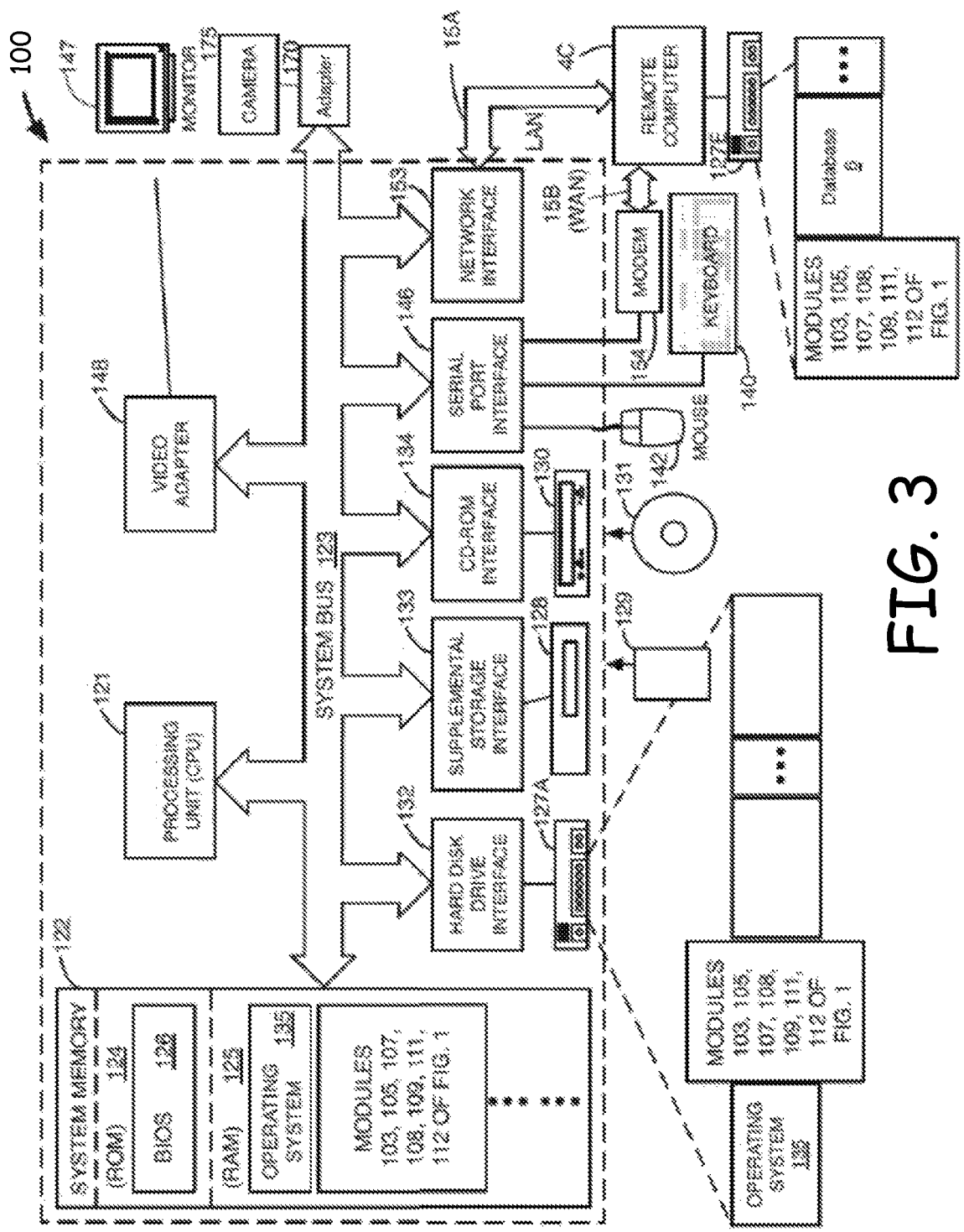
FIG. 3 is a functional block diagram of one exemplary embodiment of a computing system that may form one of the system components of the SVS.

FIG. 3 is a functional block diagram of one exemplary embodiment of a computing system that may form one of the system components of the SVS. The illustrated system, as well as each of the components may be a physical machine in a physical environment or a virtual machine instance running in a virtual private cloud provided by a commercial cloud-computing provider, associated with any component of the system of the present disclosure. One of ordinary skill in the art understands that the written description associated with FIG. 3 may be applicable to any system component described as running system content, applications, tiers, programs, process flows, methods, etc. For example, one of ordinary skill in the art will recognize that the SVS in combination with the computing system of FIG. 3 may support a virtualized environment. That is, the SVS may execute the software of this disclosure in a virtualized environment where a virtual machine is running on a hypervisor that is supported across a number of physical machines. However, other configurations besides the virtualized environment are possible and are included within the scope of this disclosure.

Referring again to FIG. 3, the computing system, or server 100, may comprise a processing unit 121, a system memory 122, and a system bus 123 that couples various system components including the system memory 122 to the processing unit 121. The system bus 123 may comprise any of several types of bus structures including a memory bus or memory controller, a peripheral bus, and a local bus using any of a variety of bus architectures. The system memory may comprises a read-only memory (ROM) 124 and a random access memory (RAM) 125. A basic input/output system (BIOS) 126, containing the basic routines that help to transfer information between elements within computer 120, such as during start-up, is stored in ROM 124.

The server 100 may comprise a hard disk drive 127A for reading from and writing to a hard disk, not shown, a supplemental storage drive for reading from or writing to a removable supplemental storage 129 (like flash memory and/or a USB drive) and an optical disk drive 130 for reading from or writing to a removable optical disk 131 such as a CD-ROM or other optical media. Hard disk drive 127A, magnetic disk drive 128, and optical disk drive 130 are illustrated as being connected to system bus 123 by a hard disk drive interface 132, a supplemental storage drive interface 133, and an optical disk drive interface 134, respectively.

Although the exemplary environment described herein is illustrated as employing hard disk 127A, removable magnetic disk 129, and removable optical disk 131, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of the invention. Such uses of other forms of computer readable media besides the hardware illustrated will be used in internet-connected devices such as in a portable devices and/or personal digital assistants (PDAs).

The drives and their associated computer readable media provide nonvolatile storage of computer-executable instructions, data structures, program modules, and other data for computer or client devices. A number of program modules may be stored on hard disk 127, magnetic disk 129, optical disk 131, ROM 124, or RAM 125, including, but not limited to, an operating system 135 as well as various modules and routines as presented in FIG. 2, as well as the various heuristics, algorithms and data. Program modules comprise routines, sub-routines, programs, extendable objects, components, data structures, etc., which perform particular tasks or implement particular abstract data types. Aspects of the present invention may be implemented in the form of a downloadable, client-side, application modules, which are executed by server 100 in order to provide the functionality described herein.

A user may enter commands and information into server 100 through input devices, such as a keyboard 140 and a pointing device 142. Pointing devices may comprise a mouse, a trackball, and an electronic pen that may be used in conjunction with an electronic tablet. Other input devices (not shown) may comprise a microphone, joystick, game pad, satellite dish, scanner, or the like. These and other input devices are often connected to processing unit 121 through a serial port interface 146 that is coupled to the system bus 123, but may be connected by other interfaces, such as a parallel port, game port, a universal serial bus (USB), wireless interface such as WIFI or BlueTooth, or the like. Likewise, the user can enter commands through a browser type interface running on a separate computer, laptop, hand-held device, etc., that connects to the server 100 through a LAN 15A, WAN 15B or other interface.

The display monitor 147 may also be connected to system bus 123 via an interface, such as a video adapter 148. The display 147 may comprise any type of display devices such as a liquid crystal display (LCD), a plasma display, an organic light-emitting diode (OLEO) display, and a cathode ray tube (CRT) display.

A camera 175 may also be connected to system bus 123 via an interface, such as an adapter 170. The camera 175 may comprise a video camera such as a webcam. The camera 175 may comprise a CCD (charge-coupled device) camera or a CMOS (complementary metal-oxide-semiconductor) camera. In addition to the monitor 147 and camera 175, other peripheral output devices (not shown), such as speakers and printers may also be communicatively coupled to the server 100.

Server 100 may operate in a networked environment using logical connections to one or more remote computers, such as a web server. A remote computer may comprise another personal computer, such as another server 4C, a portable computing device, a router, a network PC, a peer device, or other common network devices. While the web server 4C or a remote computer typically comprises many or all of the elements described above relative to the server 100, only a memory storage device 127E has been illustrated in FIG. 3. The logical connections depicted in FIG. 3 comprise a local area network (LAN) 15A and a wide area network (WAN) 158. Such networking environments are commonplace in offices, enterprise wide computer networks, intranets, and the Internet.

When used in a LAN networking environment, server 100 is often connected to the local area network 15A through a network interface or adapter 153. When used in a WAN networking environment, server 100 typically comprises a modem 154 or other means for establishing communications over WAN 158, such as the Internet. Modem 154, which may be internal or external, is connected to system bus 123 via serial port interface 146. In a networked environment, program modules depicted relative to the server 4C, or portions thereof, may be stored in the remote memory storage device 127E. It will be appreciated that the network connections shown are exemplary and other means of establishing a communications link between server 100 and other devices may be used.

Moreover, those skilled in the art will appreciate that the present invention may be implemented in other computer system configurations, including hand-held devices, multi-processor systems, microprocessor based or programmable consumer electronics, network personal computers, minicomputers, mainframe computers, and the like. The invention may also be practiced in distributed computing environments, where tasks are performed by remote processing devices that are linked through a communications network (such as communications-network 15A, for example). In a distributed computing environment, program modules may be located in both local and remote memory storage devices.

In one exemplary embodiment, one or more extendable objects, applications, programs, system processes, method steps, etc. of the system of the present disclosure may be stored in the memory 112 as computer program instructions. In one exemplary embodiment related to the functional diagram of FIG. 2, the server 100 may execute, at least partially, one or more of the functional blocks.

Certain steps in the exemplary processes, process flows, and/or methods described herein naturally precede others for the invention to function as described. However, the invention is not limited to the order of the steps described if such order or sequence does not alter the functionality of the system and method of the present disclosure. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in the art of programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer readable medium. Computer-readable media comprise both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and Blu-ray disc where disks usually reproduce data magnetically, while discs reproduce data optically with lasers. Combinations of the above should also be included within the scope of computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for a computer system to automate the generation of one or more vehicle suggestions for users, the method comprising:
creating a fleet of vehicles that can be utilized by any of a plurality of users, wherein each vehicle within the fleet of vehicles includes a telematics devices installed therein;
activating one or more of the telematics devices to begin collecting vehicle operational data and to transmit the collected vehicle operational data to a computer system as telematics data;
the computer system receiving the telematics data that is electronically transmitted from one or more the telematic devices in fleet of vehicles;
the computer system receiving user preference data from one or more of the plurality of users;
the computer system creating a user profile for each user of the plurality of users, wherein each user profile is based at least in part on the user preference data received from the user and telematics data associated with one or more of an assigned vehicle that is presently utilized by the user and one or more previously assigned vehicles that have previously been utilized by the user;
the computer system receiving an event transmitted over the network from a user device, wherein the event is the result of a user submitting a vehicle request utilizing the user device and wherein the vehicle request includes one or more parameters pertaining to desired characteristics of a vehicle;
the computer system, in response to receiving the vehicle request, identifying a domain of available vehicles selected from the plurality of vehicles;
the computer system analyzing the one or more parameters in view of the user profile and the domain of available vehicles;
identifying the current location of the user's assigned vehicle by parsing the telematics data received from the assigned vehicle; and
automatically generating a vehicle suggestion report comprising one or more entries with each entry identifying a vehicle selected from the domain of available vehicles, wherein the vehicle for each entry is selected based at least in part on the one or more parameters matching with characteristics of the vehicle, the user profile and the identified current location of the user's assigned vehicle; and
presenting the vehicle suggestion report to the user device, with each entry in the vehicle suggestion report including a link to a network accessible page providing further details regarding the vehicle identified in the entry.

2. The method of claim 1, wherein the action of analyzing the one or more parameters in view of the user profile and the domain of available vehicles further comprises creating a match rating for each vehicle in the domain of available vehicles by applying a series of heuristics to identify how closely the characteristics of each vehicle match the one or more parameters and the user preference data in the user profile.

3. The method of claim 2, further comprises ranking the vehicles in the domain of available vehicles based on the match rating.

4. The method of claim 2, wherein the action of creating a match rating for each vehicle in the domain of available vehicles further comprises adjusting the match rating based on the current location of the user's assigned vehicle.

5. The method of claim 4, further comprises ranking the vehicles in the domain of available vehicles based on the match rating.

6. The method of claim 4, wherein the action of creating a match rating for each vehicle in the domain of available vehicles further comprises adjusting the match rating based on the current location of the each vehicle in the domain of available vehicles.

7. The method of claim 6, further comprises ranking the vehicles in the domain of available vehicles based on the match rating.

8. The method of claim 7, wherein the action of generating a vehicle suggestion report selecting a number of vehicles with the highest match rating.

9. The method of claim 2, further comprising the actions of:
   the computer system receiving a rejection event transmitted over the network from the user device, wherein the rejection event is the result of a user submitting rejecting each vehicle presented in the vehicle report;
   in response to receiving the rejection event, the computer system requesting additional vehicle preference data from the user;
   in response to receiving the additional vehicle preference data, the computer system:
      augmenting the user profile;
      automatically generating a new vehicle suggestion report comprising one or more vehicles selected from the domain of available vehicles, wherein the one or more vehicles are selected based at least in part on the one or more parameters matching with characteristics of the vehicle, the augmented user profile and the identified current location of the user's assigned vehicle; and
      presenting the new vehicle suggestion report to the user device, with each entry in the new vehicle suggestion report including a link to a network accessible page providing further details regarding the vehicle identified in the entry.

10. A system to automate the generation of one or more vehicle suggestions for users, the system comprising:
   a fleet of vehicles that can be utilized by any of a plurality of users, wherein each vehicle within the fleet of vehicles includes a telematics devices installed therein;
   a computer system configured to:
      activate one or more of the telematics devices to begin collecting vehicle operational data and to transmit the collected vehicle operational data to the computer system as telematics data;
      receive the telematics data that is electronically transmitted from the one or more telematic devices within the fleet of vehicles;
      receive user preference data from one or more of the plurality of users;
      create a user profile for each user of the plurality of users, wherein each user profile is based at least in part on the user preference data received from the user and telematics data associated with one or more of an assigned vehicle that is presently utilized by the user and one or more previously assigned vehicles that have previously been utilized by the user;
      receive an event transmitted over the network from a user device, wherein the event is the result of a user submitting a vehicle request utilizing the user device and wherein the vehicle request includes one or more parameters pertaining to desired characteristics of a vehicle;
      in response to receiving the vehicle request, identifying a domain of available vehicles selected from the plurality of vehicles;
      analyzing the one or more parameters in view of the user profile and the domain of available vehicles;
      identifying the current location of the user's assigned vehicle by parsing the telematics data received from the assigned vehicle; and
   a report generator configured to:
      automatically generate a vehicle suggestion report comprising one or more entries with each entry identifying a vehicle selected from the domain of available vehicles, wherein the vehicle for each entry is selected based at least in part on the one or more parameters matching with characteristics of the vehicle, the user profile and the identified current location of the user's assigned vehicle; and
      present the vehicle suggestion report to the user device, with each entry in the vehicle suggestion report including a link to a network accessible page providing further details regarding the vehicle identified in the entry.

* * * * *